Oct. 25, 1932.     R. McGARRAUGH     1,884,053
FISH LURE
Filed March 20, 1931     2 Sheets-Sheet 1

Witness
H. Wordard

Inventor
Robert McGarraugh
By H. B. Willson &Co.
Attorneys.

Oct. 25, 1932. R. McGARRAUGH 1,884,053
FISH LURE
Filed March 20, 1931 2 Sheets-Sheet 2
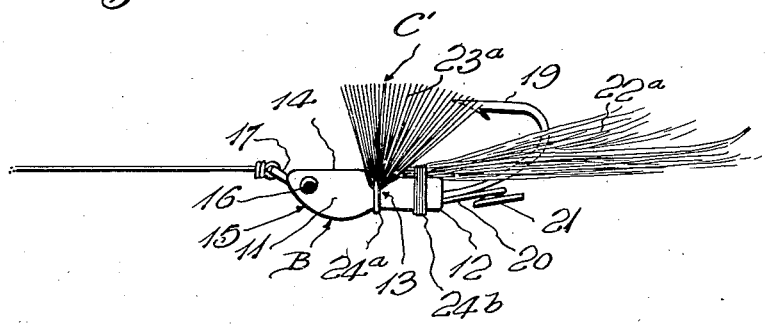
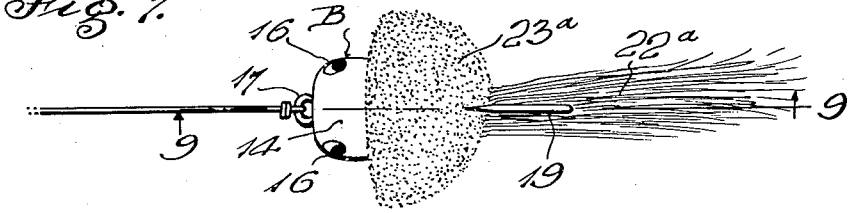
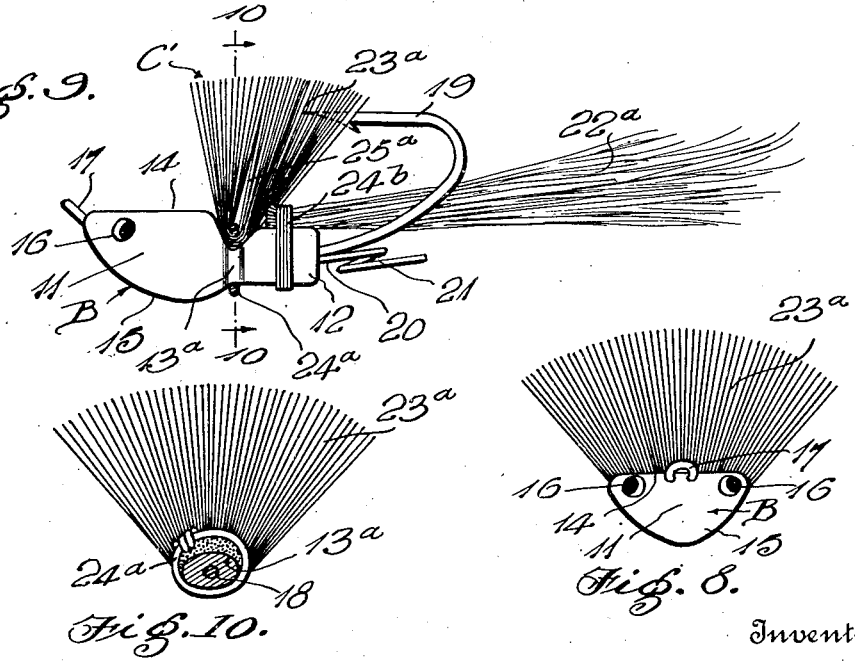
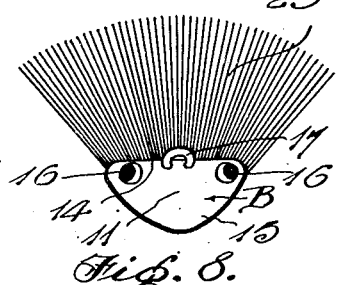

Patented Oct. 25, 1932

1,884,053

UNITED STATES PATENT OFFICE

ROBERT McGARRAUGH, OF SAN ANTONIO, TEXAS

FISH LURE

Application filed March 20, 1931. Serial No. 524,132.

This application is a continuation in part of my allowed U. S. application Serial No. 465,198, filed July 1, 1930, and allowed February 18, 1931.

The invention relates to a rather simple and inexpensive, yet an efficient and desirable fish lure of the general type having a body provided with line-attaching means at the front end of a head simulating portion, a hook projecting rearwardly from the body, and a dress formed from feathers, hairs, or the like, said dress being secured to the body and projecting rearwardly to totally or partially obscure the hook.

One object of the invention is to provide improved means for attaching a second hook or an ordinary pork rind bait or other desired bait to the lure, in such position that it will constitute a movable tail for said lure.

Another object is to provide a novel construction in which hairs used for dressing the lure, are secured by a binding, in a groove, the securing being such that said hairs obscure the binding and are made to provide a distinctive collar at the rear of the head simulating portion of the body.

Another object is to make use of stiff hairs or bristles and to so relate them with the hook that they form an effective guard to prevent said hook from catching upon roots or other snags.

A still further aim is the provision of a novel method for producing the above-named collar.

With the foregoing and minor objects in view, the invention resides in the novel subject matter hereinafter described and claimed, description being accomplished by reference to the accompanying drawings.

Figure 1:
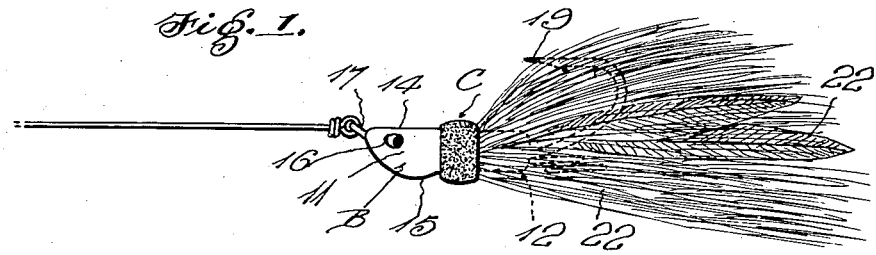
Fig. 1 is a side elevation showing a lure in which the collar is formed by trimming hairs to stubble-like length.
Figure 2:
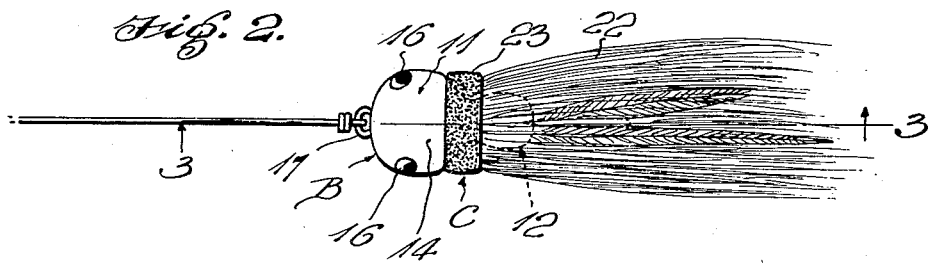
Fig. 2 is a top plan view of the lure shown in Fig. 1.
Figure 3:
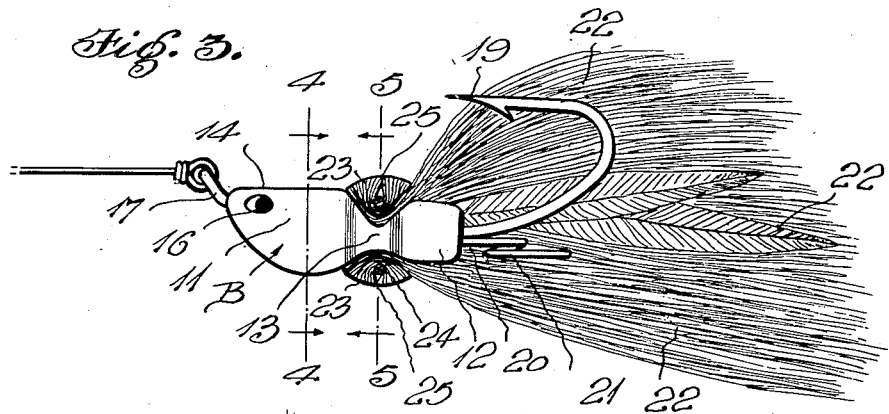
Fig. 3 is a much enlarged longitudinal sectional view on line 3—3 of Fig. 2.
Figure 4:
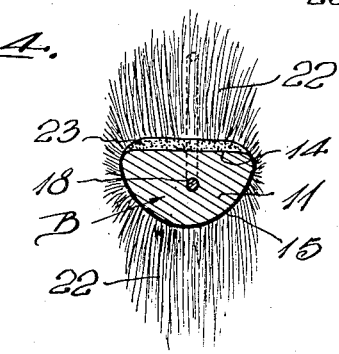
Figure 5:
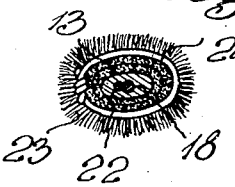

Figs. 4 and 5 are transverse sectional views on lines 4—4 and 5—5 of Fig. 3.

Fig. 6 is a side elevation of a lure in which stiff hairs or bristles are used to form the collar and to provide a guard for the hook.

Fig. 7 is a top plan view of the lure shown in Fig. 6.

Fig. 8 is a front elevation of the lure shown in Figs. 6 and 7.

Fig. 9 is a much enlarged longitudinal sectional view on line 9—9 of Fig. 7.

Fig. 10 is a transverse sectional view on line 10—10 of Fig. 9.

The body B is preferably of the same shape in both forms of the invention. This body may either be in the nature of a sinker or a float and it is provided with an enlarged front head-simulating portion 11, a reduced rear substantially cylindrical portion 12, and a peripheral groove at the juncture of said portions 11 and 12, said groove extending at least partially around the circumference of the body. In the form of the invention shown in Figs. 1 to 5, the groove 13 extends throughout the circumference of the body, whereas in the construction illustrated in Figs. 6 to 10, said groove extends across the top and vertical side portions of the body. The head-simulating portion 11 is preferably formed with a substantially flat upper side 14 and with a longitudinally and transversely convex lower side 15. This portion 11 is suitably painted throughout its area and is provided with eye simulations 16, and the attaching eye 17 for the fishing line, forms an effective representation of a nose.

The eye 17 is preferably on the front end of a hook shank 18 which is embedded in the body B, the hook 19 of said shank being presented forwardly in spaced relation with said body. When body B is of the sinker type, its shape is such that the center of gravity is well below the eye 17, so that the hook travels through the water in an upright position. When the lure is of the floating type, the essential proportions are the same, with the exception that the hook position is down, its weight serving to maintain the floating body upright on the water. The sinker type of this lure when in actual use is attached to a revolving spinner ahead of loop 17, which spinner imparts to the lure a lively swimming action. I embed a wire 20 in the body B, said wire projecting rearwardly and having a pig-tail loop 21 for bait or hook attachment.

The features of construction so far described are generic to both forms of the invention herein illustrated. Other generic features exist but can best be explained by first describing the form of construction shown in Figs. 1 to 5, and by then explaining the structure shown in Figs. 6 to 10.

In the construction shown in Figs. 1 to 5, long flexible dress-forming elements 22, such as hairs and small feathers, are secured to the body B around its rear portion 12 and project rearwardly to totally or partially obscure the hook 19 and the hook or bait-holding means 20—21. These dress-forming elements may be secured to the body in any preferred way, for instance, by cementing, by wrapping, or by both. A number of them preferably are anchored at their front ends in the groove 13, while their rear ends are left free to "crawl" in the water, the free rear ends of said elements remaining in proximity to the hook 19, due to the shape of the groove 13. Around the front ends of the elements 22, there is a multiplicity of short substantially U-shaped hairs 23 (preferably tubular deer hairs). The bight portions of these U-shaped hairs receive a binding 24 such as a length of wire with its ends twisted tightly together, and this binding is so tightly drawn that the hairs 23 in contact with it and near it are completely folded upon themselves as denoted at 25 in Fig. 3, these folded hairs therefore completely obscuring the binding 24. All of the hairs 23 have both of their ends free and it will be observed that the tight binding 24 causes these free ends to project laterally in all directions from the body B, the ends being preferably trimmed to a stubble-like length to provide a distinctive collar C at the rear end of the head-simulating portion 11 of the body B. The attractively decorated portion 11 with its eyes 16 and nose 17, the graceful rearwardly extending dress-forming elements 22 and the distinctive collar C between said head-simulating portion and said elements, provide a very attractive and efficient bait.

In the form of construction shown in Figs. 6 to 10, the formation C' which will be termed a collar, for want of a better term generic to said formation and the collar C, does not extend entirely around the body B but is primarily at the top of the latter and somewhat at its sides. Moreover, the collar C' projects a much greater distance from the body and it is formed from stiff hairs or bristles, said hairs being disposed in a mass which projects from the body beyond the hook 19 and extends rearwardly at least to said hook. Preferably, some of the hairs of this mass project rearwardly partly around the hook. Due to the stiffness of the hairs, they form an effective guard which prevents the hook 19 from catching upon snags, yet said hairs are readily mashed inwardly when a fish bites upon the lure, so that they will not interfere with the efficiency of the hook.

In forming the collar C', the stiff hairs 23$^a$ are held in substantially U-shape by a tight binding 24$^a$ and a plurality of said hairs are by the tightness of said binding, folded entirely upon themselves as indicated at 25$^a$ in Fig. 9, obscuring the portion of the binding which anchors them. Both ends of the hairs are free and they are trimmed to impart the desired shape to the collar C'.

Dress-forming hairs 22$^a$ are shown projecting rearwardly from the grooved portion of the body B. The front ends of these hairs are preferably anchored in the groove 13$^a$ but in order that they may extend directly rearward instead of at inclinations, they are preferably bound to the rear end of the body as shown at 24$^b$. Suitable water-proof cement may of course be used in the anchorage of these elements and in fact all others used in constructing either form of the invention.

It will be understood that the hairs 23 and 23$^a$ are not pre-shaped, but they are drawn into U-shaped form by the binding 24 or 24$^a$. The hairs are placed across the groove 13 or 13$^a$ and may be initially held by glue or the like, and when the binding 24 or 24$^a$ is applied and tightened, it draws said hairs into U-shape, causing some of them to fold completely upon themselves to obscure the binding. After application of the binding, the hairs are trimmed to the required length to either provide only a collar or to provide a combined collar and guard for the hook.

It will be seen from the foregoing that I have provided a novel and advantageous lure and method of constructing the same, that both forms of said lure possess an unusually distinctive and lifelike appearance, and that they will therefore be effective to a high degree.

I claim:—

1. In a fish lure, a body having a front head-simulating portion and a peripheral groove at the rear end of said head-simulating portion, said groove extending at least partially around said body and having front and rear walls both inclined to the length of the body, a multiplicity of U-shaped hairs having their free ends spaced substantially equidistantly from their bight portions, said bight portions being disposed in said groove, and a tight binding around said body and extending through said bight portions, the opposite end portions of said hairs projecting laterally from said body, giving the appearance of a collar at the rear end of said head-simulating portion and obscuring the portion of said binding which extends through said bight portions of the hairs.

2. In a fish lure, a body having a front head-simulating portion and a peripheral groove behind said head-simulating portion extending around the body, a multiplicity of short substantially U-shaped hairs having their bight portions in tight contact with each other, the ends of said hairs radiating from said groove throughout the circumference of the latter, an annular binding around the body extending through said bight portions of said hairs, said binding holding said hairs folded upon themselves in position to completely obscure the binding, and a plurality of dress-forming elements secured to said body and projecting rearwardly from the grooved portion thereof, both ends of said U-shaped hairs being trimmed close to said body to stubble-like length and forming a collar between said head-simulating portion and said dress.

3. In a fish lure, a body having a transverse peripheral groove, said body being provided with a rigid rearwardly projecting hook shank having a forwardly turned hook, the portion of said body in advance of said groove constituting a head simulation, a multiplicity of stiff substantially U-shaped bristles having free ends, the bight portions of said bristles being in tight contact with each other and disposed transversely of said groove, and an annular binding within said bight portions of the bristles and holding them in said groove and causing said free ends of the bristles to project laterally from the body, said free bristle ends projecting laterally beyond said hook and being disposed in a mass which extends rearwardly at least to the front end of said hook, whereby a guard for the hook is provided.

4. A fish lure comprising a body having line-attaching means at its front end, a hook shank projecting rearwardly from said body and having a hook, attaching means for a hook or bait mounted behind said body, and a dress secured to said body and projecting rearwardly around said hook shank and said attaching means.

5. A fish lure comprising a body having line-attaching means at its front end, a hook shank projecting rearwardly from said body and having a hook, a pig-tail attaching loop mounted behind said body, and a dress secured to said body and projecting rearwardly around said hook shank and said pig-tail loop.

6. A fish lure comprising a body having line-attaching means at its front end, a hook shank projecting rearwardly from said body and having a hook, a wire rigidly secured to said body and projecting rearwardly therefrom, said wire being bent to provide a pig-tail anchoring loop disposed near said hook, and a dress secured to said body and projecting rearwardly around said hook shank, wire and loop.

7. In a device of the class described, a body having line-attaching means at its front end, a shank projecting rearwardly from said body and having a hook, and a wire rigidly secured to said body and projecting rearwardly therefrom, said wire being bent to provide a pig-tail loop for bait or hook attachment.

8. In a device of the class described, a body having line-attaching means at its front end, a shank projecting rearwardly from said body and having a hook, and a wire rigidly secured to said body and projecting rearwardly therefrom, said wire being bent to provide attaching means for a hook or bait.

9. In fish lure manufacture, the method of forming a circumferentially extending collar on a rigid body having a circumferentially extending groove, consisting in covering an extended portion of the circumference of said body with a multiplicity of hairs and extending said hairs across said groove, passing a binding around said body and the groove-spanning portions of said hairs, tightening said binding and thereby drawing said groove-spanning portions of said hairs into said groove, thus distorting said hairs into substantially U-shape and folding a plurality of them upon themselves to obscure the hair-engaging portion of the binding, and trimming both ends of the U-shaped hairs to shape the collar.

10. In fish lure manufacture, the method of forming a circumferentially extending collar on a rigid body having a groove throughout its circumference, consisting in completely surrounding said body with hairs and extending the latter across said groove, passing a binding around said body and the groove-spanning portions of said hairs, tightening said binding and thereby drawing said groove-spanning portions of the hairs into said groove, thus distorting said hairs into substantially U-shape and folding a plurality of them upon themselves to entirely obscure the binding, and trimming both ends of the U-shaped hairs to stubble-like length close to and throughout the circumference of said body to shape the collar.

In testimony whereof I affix my signature.

ROBERT McGARRAUGH.